United States Patent [19]

Stocchiero

[11] Patent Number: 4,467,021
[45] Date of Patent: Aug. 21, 1984

[54] CELL-CONTAINER AND CELL-LID FOR ELECTRIC-ACCUMULATORS PARTICULARLY FOR THOSE MEANT FOR TRACTION

[76] Inventor: Olimpio Stocchiero, 4 - Via Kennedy, 36050 Montorso Vicentino, Italy

[21] Appl. No.: 451,084

[22] Filed: Dec. 20, 1982

[30] Foreign Application Priority Data

Dec. 21, 1981 [IT] Italy ................. 85653 A/81
Apr. 8, 1982 [IT] Italy ................. 85548 A/82

[51] Int. Cl.³ ............................................. H01M 2/04
[52] U.S. Cl. ................................ 429/175; 429/163
[58] Field of Search ................ 429/175, 176, 163

[56] References Cited

U.S. PATENT DOCUMENTS

| | | | |
|---|---|---|---|
| 1,367,594 | 2/1921 | Ford | 429/175 |
| 2,052,499 | 8/1936 | Strough | 429/175 X |
| 2,585,564 | 2/1952 | Lubeck | 429/175 X |
| 3,360,403 | 12/1967 | Halsall | 429/175 X |
| 4,216,277 | 8/1980 | Uba | 429/175 |

FOREIGN PATENT DOCUMENTS 2087637 5/1982 United Kingdom ................ 429/175

*Primary Examiner*—Anthony Skapars
*Attorney, Agent, or Firm*—Birch, Stewart, Kolasch & Birch

[57] ABSTRACT

The cell-container, obtained by blow-forming, thus having a minor thickness, presents at the upper-rim a conformation in two steps (1) permitting the mating of the cell-lid to the cell-container remaining within unified overall-dimensions, as the welding-bead between the cell-lid and the cell-container forms itself on the inside instead of on the outside of the same. Furthermore, it becomes possible to increase the welding-surface according to one's need if the cell-container is cut in correspondence with the flat-part of the step. The cell-container presents, furthermore, horizontal-recessings at various levels permitting the modular-cutting of the product according to unified measures.

The cell-lid's form is concave towards the exterior in order to follow the dilatations of the poles during the service-life of the battery. The cell-lid is also furnished with a molded ring, which has a circular profile around the electrolyte's inlet thus avoiding the application of a gasket onto the top-cover.

3 Claims, 12 Drawing Figures

CELL-CONTAINER AND CELL-LID FOR ELECTRIC-ACCUMULATORS PARTICULARLY FOR THOSE MEANT FOR TRACTION

BACKGROUND AND SUMMARY OF THE INVENTION

The present invention regards some improvements in construction of cell-containers for accumulators, especialy for those meant for construction.

The above-mentioned improvements regard the construction-form of the accumulator's cell-container and of its lid and the way the cell-lid is welded to the cell-container itself.

It is well-known that the overall-dimensions of accumulator's cell-containers have been standardized according to international specifications. This doubtlessly positive and necessary fact forces the constructors of accumulators to adopt construction solutions which, while keeping overall-dimensions in parity, enable an increase of useful volume of the electrolyte's flooding capacity, thus obtaining an increased energetic-capacity of the accumulator itself.

Another problem of equal importance is to obtain perfect seal-tightness in welding the cell-lid to the cell-container. Furthermore, during the service-life, the cell-lid tends to crack due to the inevitable elongation of the positive pole caused by the well-known phenomenons of electrochemical nature; the connected problem is thus to obtain that both, the cell-lid and the cell-container, stand the above-mentioned elongation without damage.

Constructors of industrial accumulators faced these problems and solved them in different ways. Regarding the overall-dimensions of cell-containers, for example, the usual technique provides parallelopiped-formed cell-containers obtained by molding in polypropylene or similar thermoplastic-materials. The standard thickness usually obtainable by this proceeding is of approx. 3 mm.

To avoid exceeding the standard overall-dimensions, the cell-lid is joined to the cell-container by butt-welding, founding the contacting parts of the lid to the rim of the cell-container. However, as the above-mentioned welding generates a perimetric-bead, it is actually necessary to trim the same in order to be able to place one accumulator along the other without losing any space (like, for example, in batteries of accumulators for traction). This trimming-operation, aside from the cost of the operation in itself, can lead to uncovering of points lacking material caused by, for example, imprisoned air-locks or, anyway, by bad welding; consequently, there exists a possibility of electrolyte-leaks or, still of the impossibility of automatically topping-up through the pneumatic top-cover.

The improvements object of the present invention solve all the problems related to the trimming of the bead, as the bead forms itself on the inside and not on the outside of the cell-container. This was made possible by two factors and precisely by (1) the particular conformation of the cell-lid and of the cell-container's rim provided with a male-female mating remaining with the standard overall-dimensions and (2) by the extremely reduced thickness of the cell-container's walls and that of the cell-lid's rim, reduced to more than a half in comparison to the generally used ones.

It is obvious that, if there were no reduction of thickness, the said solution of the cell-lid having an external rim in respect to the walls of the cell-container, would lead to an increase of the overall-dimensions of the battery. Furthermore, the construction-method of the cell-container itself should be kept present, as it is generally made by injection-molding, usually in polypropylene, whereby in the present invention it is obtained by blow-forming. This process of blowing the form of the cell-container permits to obtain extremely reduced thickness of its walls, arriving up to 60% in comparison to the thermoplastic-molding process; it enables forms with undercuts otherwise not obtainable or prohibitedly expensive, due to the extremely complex molds needed in such a case.

The above-mentioned blow-forming process permits the reduction of thickness of the cell-container's walls, as well as considerable savings of material. Another advantage is represented by the fact that the molds involved are very simple and made in easily-workable materials.

Another element of basic importance deriving from the present invention is that it is possible to increase the welding-surface between the cell-lid and the cell-container, independently from the thickness. This is due to the special forming of the head of the terminal part of the cell-container obtained directly by the form of the blowing-mold. Not the least advantage of the present invention is, further, to have foreseen perimetric-horizontal recessings, obtained directly in forming and placed at various standardized levels so that by one and only blowing it becomes possible to obtain cell-containers with modular-systems, of various heights, depending on necessity. In this case the advantage for the constructor lies in the possibility to reduce the number of forming-molds, obtaining from one mold several cell-containers of different height and capacity; the constructor of industrial-batteries, on his part, can reduce his store, still having the possibility to assemble batteries of different capacities. Another function of said horizontal recessings is to avoid possible deformations of the cell-container, either in its terminal part where it is matched and welded to the cell-lid or in its central part, particularly in case of considerably high cell-containers. Said recessings have still another, not secondary, function of guiding and locking the iner cells of the battery.

The last improvement, part of the present invention, regards the cell-lid of the accumulator, made in such a way to stand, without damage, the elongation of the poles. The known technique in this field regards performances using a plastic-type binder fitted-in between the cell-lid and the cell-container, this type permitting a certain elongation of the poles. Said solution is mostly used in accumulators for cars, but it doesn't solve the problem for industrial accumulators, especially those meant for traction, where the height of the cells may arrive to 650 mm and where the said elongations are consequently increased. Another known solution consists in having created, within the cell-lid and in the area around each of the poles a series of concentric-rings which, due to their form and construction, permit some elongation of the poles.

The improvement regarding the cell-lid in the present invention solves the problem of deformation of the same and, thus, of its ability to stand the elongation of the poles, as said cell-lid is constructed in a special, externally concave form. By this extremely simple solution, which is at the same time extremely functional and economical, the elastic-tensions developed by the elongation of the poles are evenly distributed on the whole of the cell-lid's surface instead of being concentrated on a reduced area as it is generally the case. In this way the possibility of the cell-lid's cracking under the pressure of the differently distributed tensions is nullified or, in any case, drastically reduced. Another interesting characteristics of not secondary importance presented by this solution is that, due to its special convex-form, the cell-lid holds possible leaks of electrolyte caused by overflowing of the central top-cover when recharging distilled water. Thus the process of removal and cleaning-up of the overflown liquid, in case such a thing happens, is simplified and the chance that the liquid might run-down between the accumulators and settle at the bottom of the accumulator's box which, although usually constructed in plastified-iron, could be, at least in some weak-points, effected by the action of electrolyte, is avoided.

Another characteristics of the present improvement is that the cell-lid is furnished with a ring molded around the inlet of the electrolyte, thus avoiding eventual leaks when recharging the battery while the top-cover is removed. In this way the application of a gasket on the top-cover becomes unnecessary, as said barrier, circular and deformable, acts as a sealing-element.

BRIEF DESCRIPTION OF THE DRAWINGS

This and other advantages will evidently result even clearer in the description of a preferable execution-form of the improvements object of the present invention, as said description is given as a non-limiting indication, illustrated by the drawings where.

DETAILED DESCRIPTION OF THE INVENTION

Figure 1:
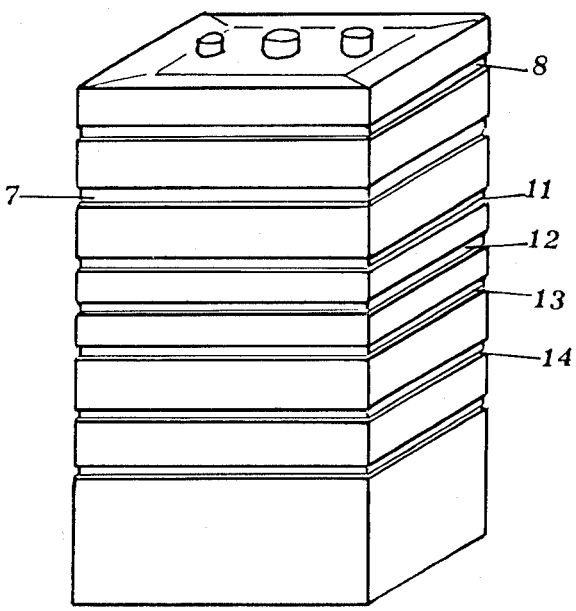
FIG. 1 shows a prospect of the accumulator's cell-container complete with its welded lid.
Figures 2, 3, 4:
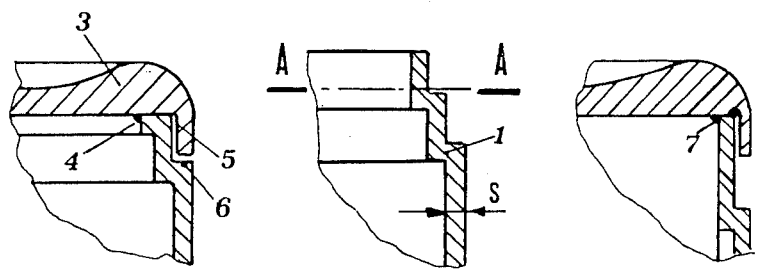
FIGS. 2 and 4 show, in evidence, the welding between the cell-lid and the cell-container's base, respectively with a double and a simple thickness.
FIG. 3 shows, in evidence, the terminal-section of the mouth-piece of the cell-container as it is formed by molding before butting-up.

In reference to the improvements regarding the cell-container and in respect to FIG. 3, the plastic-material, usually polypropylene, is blown into a parallelepiped-form, as shown in FIG. 1 and in its terminal-part its conformation is "in steps", as shown in 1, thickness being "S". When the excess of material is removed, along the line A—A, the width of the cell-container's rim, represented in 2 on FIG. 5, will exceed the thickness "S" and it will depend exclusively on the depth one has foreseen for the mold. The surface 2 represents the area to be welded onto the cell-lid 3 of the FIG. 2. It is obvious that the bead will form itself in the area 4 and 5, along the perimeter of the rim between the cell-container and the cell-lid, not touching its exterior.

Figures 5, 6, 7:
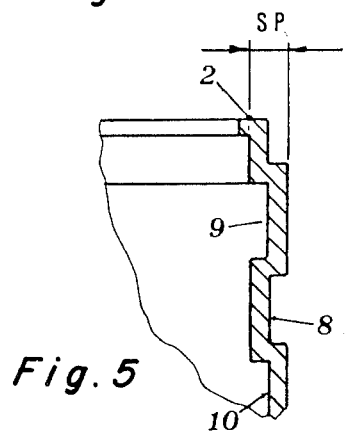
FIG. 5 shows the partial-section of the cell-container in longitudinal-senses.
FIG. 6 shows the section of the deformation on the top of the cell-container, which is avoided by the perimetric-recessings.
FIG. 7 shows the deformation of the central-part of the cell-container of considerable height, as well avoided by the above-mentioned recessings.

The cell-lid's thickness finds its place in the re-entering space obtained in the step 6, thus there will be no projections on the unified shape of the battery. The welding-solution of increased-surface here described, assures in any case a major-security welding, whereby an already sufficient grade of security for welding the cell-lid to the cell-container is given by the solution evidenced in FIG. 4. It shows the welding between the cell-lid and the cell-container, when the cell-container from FIG. 1 is cut, for example, along the line 7, in order to obtain a lower battery, starting from the manufactured article itself. It is cut along one of the recessings, corresponding to a standard-height. In this case, as there is no double-step, it is possible to use the welding-surface of the cell-container's thickness, the surface in question being already sufficient in itself to assure a perfect seal, also because the bead, which forms itself and isn't removed, contributes to the increase of the surface of contact between the cell-lid and the cell-container. FIG. 5 shows a partial-section of the cell-container's terminal-part. In it, the recessing 8 is made in order to create a reinforcing-bead close to the terminal-part of the cell-container. This reinforcement avoids possible deformation at the top of the cell-container, due to tensions developed during the blowing-process which tend to be released after the cutting along the line A—A. FIG. 6 shows, in section, the described effect of what could happen without the reinforcement through recessings 8. Furthermore, if we indicate by SP in FIG. 6 the minimum possible thickness of the various containers obtained by the molding-process (generally runing from 3.75 to 3 mm), one can immediately see how the blowing-process, the overall-dimensions remaining none-the-less within the thickness SP of the molding-process, permits a considerable increase of inner-volume, thus an increased quantity of electrolyte in the battery, while the inner and external overall-dimensions remain the same. The areas 9 and 10 represent, in fact, this increased space in comparison to that of the molding-process. It is well-known that increasing the quantity of electrolyte in parity of the overall-dimensions results in increased energetic-capacity of the battery with obvious advantages. FIG. 7 shows the form taken by a section of the battery at approx. half of its height and in very high batteries, without the reinforcement by perimetric-recessings 11, 12, 13, and 14 of FIG. 1.

As already mentioned, these reinforcements are made corresponding in height to standardized measures, in order to be able to cut the cell-containers in modulars at desired height and thus obtain batteries of different capacities, in case this is required. Said perimetric-recessings act as well as guides at inserting of the inner-cells of the battery and locking them in place.

Figure 12:
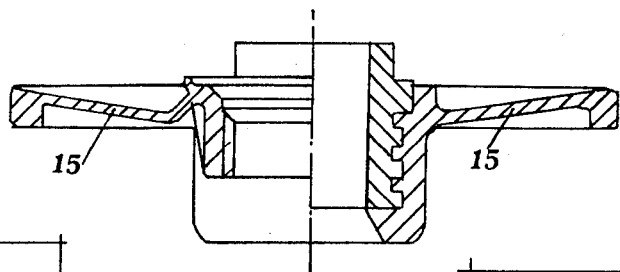
FIG. 12 is another section of the cell-lid from FIG. 8
Figure 9:
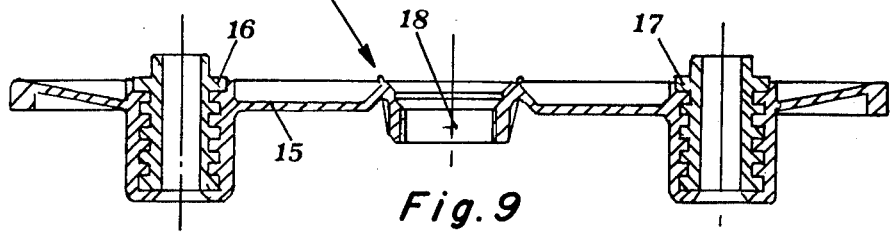
FIG. 9 shows a section of the cell-lid from FIG. 8.
Figure 8:
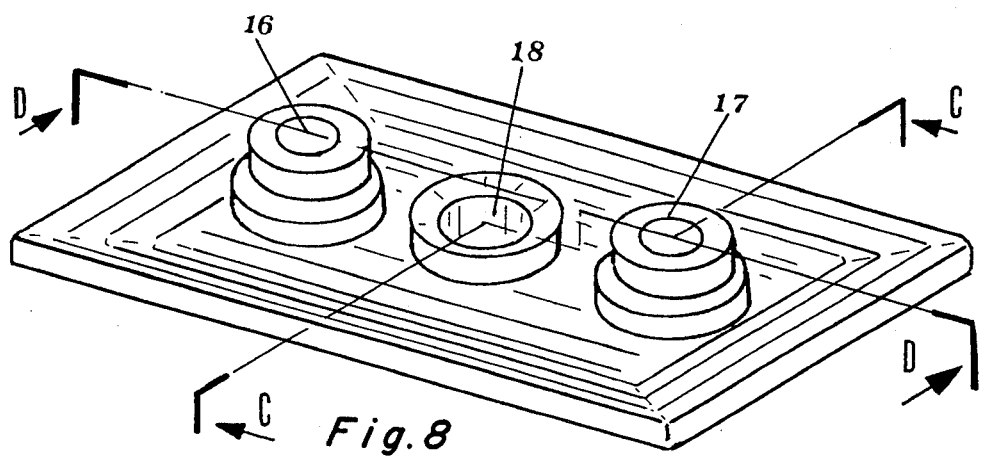
FIG. 8 shows the prospect of the deformable cell-lid.

Regarding the cell-lid of the accumulator, FIG. 9 shows the section (15) of the cell-lid with a concave-profile, which by lowering proceeds, in a nearly uniform manner, from the rims of the cell-lid to the central-area, where the poles and the central charge-inlet of the electrolyte and the topping-up are placed. The cell-lid's profile is obviously connected with the bush of the poles 16 and 17 of the FIG. 9 and with the outline-shape of the electrolyte's inlet 18. The section C—C on FIG. 12 shows, that the profile of the cell-lid is concave in both senses—longitudinal and transversal. The surface thus formed will be, therefore, elastic and able to stand the pressure produced by the dilatation of the positive pole, or poles, permitting the concave cell-lid to rise to a certain extent and, depending on the entity of dilatation, it will tend to flatten or even assume a convex-form. It is already well-known technique in this field, that the lead-bushes 16 and 17 are flooded into the plastics of the cell-lid by hot-molding. The cell-lid is then autogenously welded to the cell-container of the accumulator on the whole surface of its rim, assuring that way a perfect seal.

The poles, inserted previously into the bush-holes, are then welded to the bushes, after the autogenous welding of the cell-lid to the cell-container has been done. This way a rigid lock between the cell-lid of the accumulator and the poles is assured, but—at the same time—as already mentioned, notwithstanding the rigid connection, the elongation of the pole has been made possible due to the cell-lid's conformation permitting its deformation, while contemporaneously assuring a rigid joint between the pole and the bush flooded in the pole itself.

Figure 10:
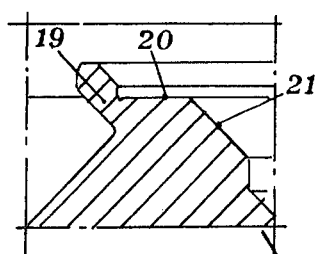
FIGS. 10 and 11 show an enlargement of construction details of the mouth-piece enabling air-tight sealing of the top-cover on the lid, without a gasket.

On the cell-lid, object of the present invention, a ring, circular in form with a special section and concentrical at the inlet of the electrolyte 9 FIG. 10, was made directly in the molding-process. This ring, projected in respect to the inlet's surface, has two functions: first, to prevent, acting as a barrier, eventual leaks of overflown electrolyte at recharging. This especially important, as such leaks may create channels of electric-discharge between the positive and negative pole of the accumulator; second, and as important, to act in place of a gasket, as said ring, circular and deformable, provides for a perfect seal when the top-cover is put in place.

Figure 11:
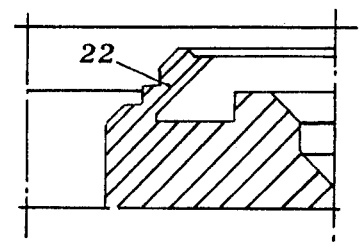

FIGS. 10 and 11 are shown two solutions of the profile for this containing-ring, both as solving the same function. In FIG. 10 the detail 19 evidently shows the section of the circular ring projected in respect to the surface of the electrolyte's inlet 18. Said projection permits to avoid overflowing of the electrolyte at recharge. Furthermore, due to the minor thickness of the ring 19, it deforms under pressure of the top-cover locking the inlet 18, which, when locked, centers onto the conical-part 21, assuring a perfect seal, as required. This avoids providing the top-cover with a gasket and is, therefore, in addition to the above-mentioned advantages, also particularly economical. FIG. 11 shows, in evidence, an equivalent solution with the ring 22, its profile converging towards the center of the inlet 18.

I claim:

1. Cell-lid for the electric-accumulators molded in polypropylene-copolymer, characterized in that it has a concave surface turned towards the outside of the cell-container and a profile of the section of the cell-lid which extends downwardly from the rim to a central area where said profile is connected with bushes of accumulator's poles and with a central-inlet of the electrolyte-solution in order to enable the poles, rigidly welded to the bushes incorporated in the cell-lid in the molding-process, to elongate during the service-life of the accumulator itself, as said cell-lid can, without any deformation-damage, follow such elongations while being hermetically hot-sealed to the cell-container.

2. Cell-lid for the electric-accumulators as set forth in claim 1, characterized in that the cell-lid, molded in polypropylene-copolymer, presents around the inlet of the electrolyte, a circular-profiled rim permitting to avoid the application of a gasket to the top-cover.

3. Cell-lid for the electric-accumulators as set forth in claim 1, characterized in that the cell-lid, molded in plastic material, presents around the inlet of the electrolyte a circular-profiled rim in order to avoid the application of a gasket to the top-cover.

* * * * *